INVENTORS
Garfield A. Dawe
Carl A. Nielsen

By: Wallenstein, Spangenberg & Hattis
Atty.

3,299,435
MEASURING AND RECORDING INSTRUMENT
Garfield A. Dawe, Northbrook, and Carl A. Nielsen, Chicago, Ill., assignors to E. H. Sargent & Company, Chicago, Ill., a corporation of Illinois
Filed July 30, 1964, Ser. No. 386,365
18 Claims. (Cl. 346—136)

This invention relates to a measuring and recording instrument having an instrument frame, a chart feed roll for advancing a chart, a chart supply roll for supplying the chart to the chart feed roll, a chart takeup roll for taking the chart from the chart feed roll, recording means adjacent the chart feed roll and movable across the chart for making a record on the chart, and reversibly operated means controlled in accordance with the condition being measured for moving the recording means, the reversibly operated means usually including a rotatable slide wire unit for performing a balancing function.

The principal object of this invention is to provide an improved measuring and recording instrument of this type which is relatively simple and rugged in construction, which is relatively inexpensive to manufacture and assemble, which may be readily serviced when necessary, which is accurate in its operation, and which is relatively universal in its functions.

Further objects of this invention reside in the constructions and arrangements of and cooperative relationships between the component parts of the measuring and recording instrument for affording the foregoing advantages, the manner of driving the chart feed roll including improved means for forwardly rotating the same at desired selected synchronous speeds and accommodating different frequencies of the applied A.C. power, the manner of recording on the chart the particular speeds at which it is being advanced by the chart feed roll, the manner of driving the chart takeup roll to tightly and uniformly roll the chart thereon, to permit unrolling of the chart therefrom for inspection purposes and to provide accurate tracking of the chart in its advancing movement, and the manner of driving the recording means including means for preventing over-travel of the recording means and damage to it and its associated components.

Other objects and advantages of this invention will become apparent to those skilled in the art upon reference to the accompanying specification, claims and drawings in which:

The measuring and recording instrument of this invention is generally designated at 10 in FIGS. 1 to 4 and it includes a bottom outer frame 11 which is slidable carried by a pair of tracks 12 which in turn are slidably carried by an instrument panel or case 13 so as to slidably mount the measuring and recording instrument in an opening in the instrument panel or case 13. The measuring and recording instrument also includes an upper inner frame which comprises a pair of side plates 14 and 15 which are secured to the lower frame 11 and which are secured together and braced by a plurality of cross bars including cross bars 16, 17 and 18. A front panel 19 having a central opening 20 is suitably secured to the lower outer frame 11 and the side plates 14 and 15 of the upper inner frame as by means of screws 21 or the like. When the measuring and recording instrument is slid into the instrument panel or case 13 it may be releasably held therein by means of thumb screws 22. By so slidably mounting the measuring and recording instrument 10 in the instrument panel or case 13 the various components of the measuring and recording instrument are made accessible for ready service or repair.

A pair of blocks 25 are secured to the inner sides of the side plates 14 and 15 for carrying rods 26 and 27 which also operate to reinforce the inner frame. A platen 28 (FIG. 4) is arranged in a portion of the opening 20 of the front panel 19 and is releasably held in place therein by rods 29 and 30 extending between the side plates 14 and 15, the platen 28 forming a surface over which the strip chart 43 passes so that notations may be readily made on the strip chart. A tear-off bar 31 is suitably secured to the front panel 19 to provide a ready means for tearing off a section of the strip chart 43 when and if this is desired. The tear-off bar 31 may also be provided with suitable indicia which is related to the graduated lines on the strip chart 43 for giving a ready indication of the values of the graduations.

The various electronic and electrical components of the measuring and recording apparatus are carried by the lower and upper frames, as for example, an amplifier 33 carried by the lower frame, power supply equipment 34 and 35 carried by the upper frame and measuring circuit components 36 carried by the upper frame. The electrical and electronic equipment for performing the measuring and recording functions of the instrument of this invention may correspond to the electrical and electronic equipment disclosed in Dawe et al., Patent No. 3,087,115 granted April 23, 1963, and, accordingly, a further description herein is unnecessary.

Figure 1:
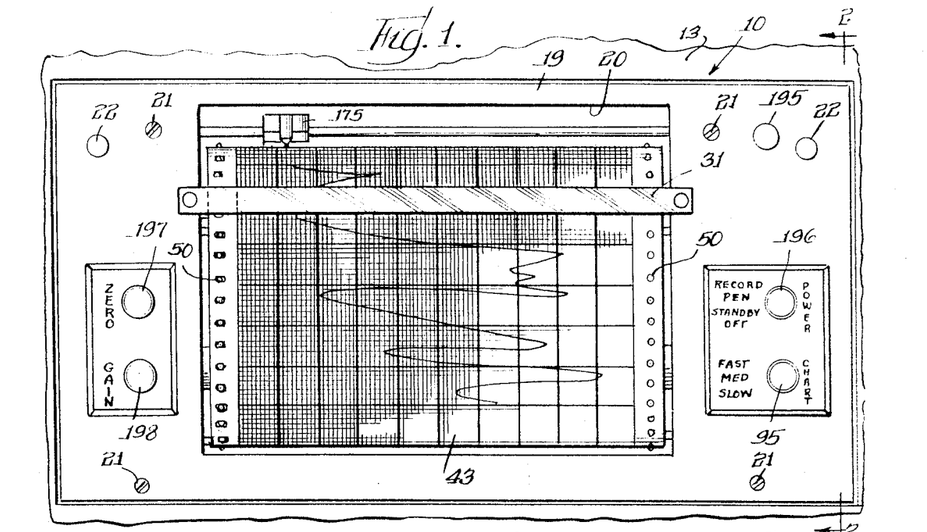
FIG. 1 is a front elevational view of the measuring and recording instrument of this invention.
Figure 2:
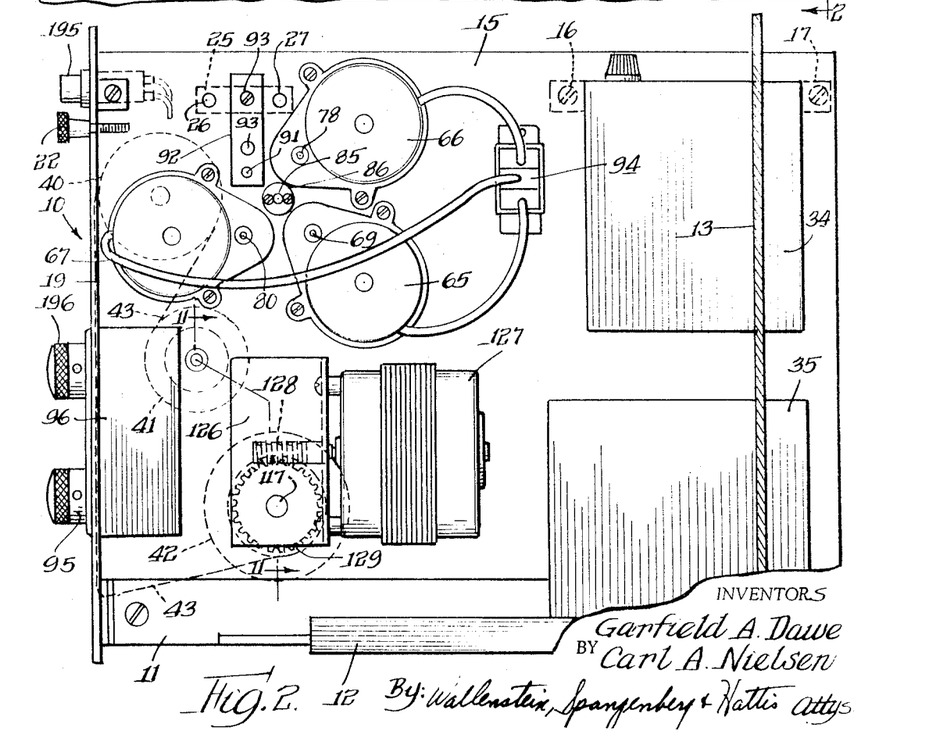
FIG. 2 is a side elevational view of the instrument looking from the right of FIG. 1 as shown by the line 2—2 of FIG. 1 and showing the instrument withdrawn from the instrument panel or instrument case.
Figure 4:
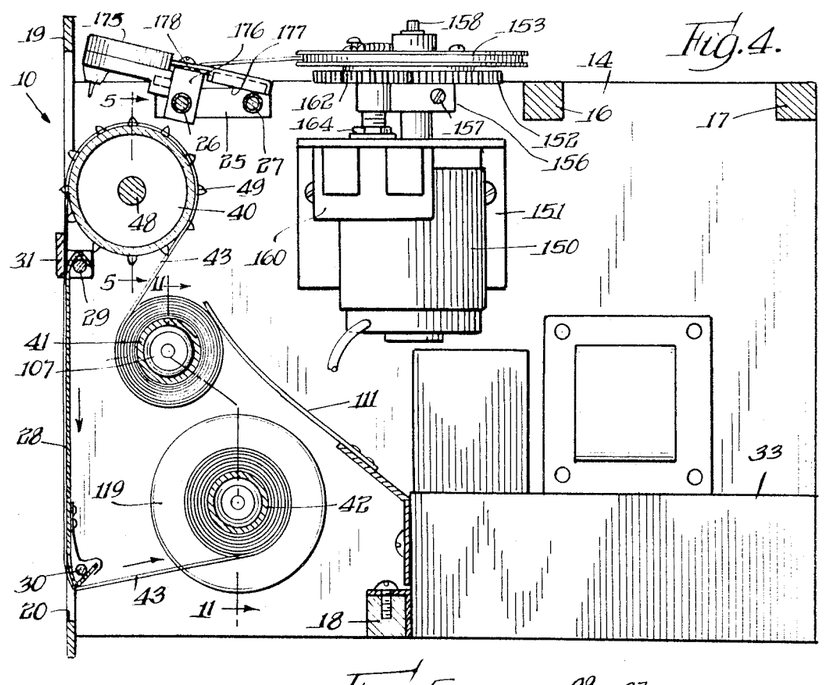
FIG. 4 is a vertical sectional view through the instrument taken substantially along the line 4—4 of FIG. 3.

Rotatably mounted between the side plates 14 and 15 are a chart feed roll 40, a chart supply roll 41 and a chart takeup roll 42, as illustrated more clearly in FIGS. 2 and 4. The chart feed roll 40 is preferably arranged near the top of the inner frame, the chart takeup roll 42 near the bottom of the inner frame and the chart supply roll 41 between the chart feed roll 40 and the chart takeup roll 42. The recording chart 43 having graduated lines thereon extends from the chart supply roll 41 over the chart feed roll 40 and past the platen 28 to the chart takeup roll 42.

Figure 5:
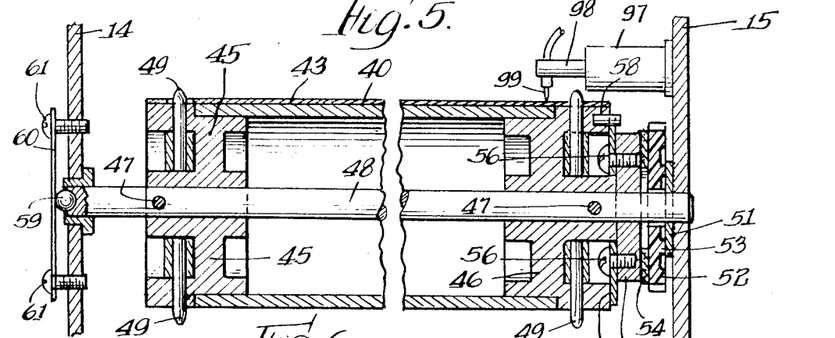
FIG. 5 is a vertical sectional view through the chart feed roll taken substantially along the line 5—5 of FIG. 4.
Figure 6:
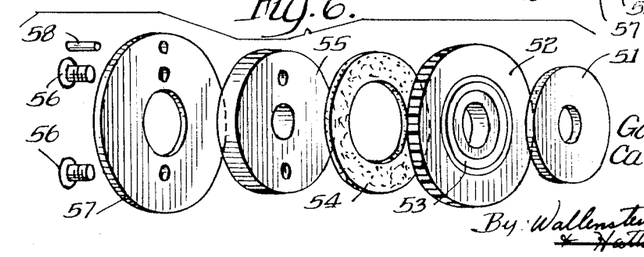
FIG. 6 is an exploded perspective view of the friction drive for the chart drive roll as illustrated at the right side of FIG. 5.
Figure 7:
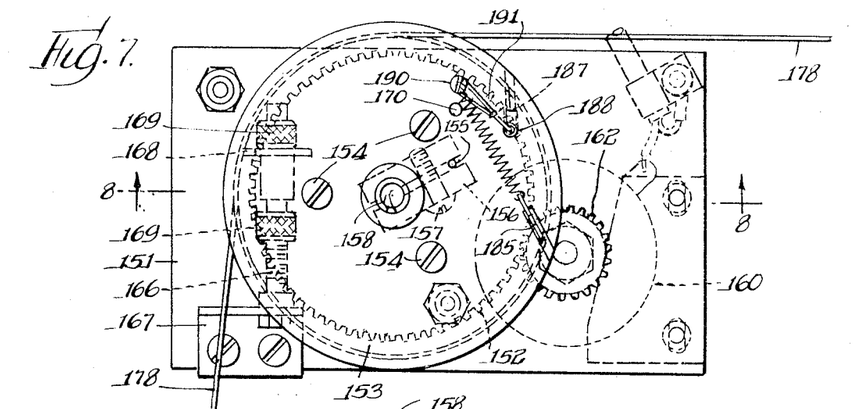
FIG. 7 is an enlarged top plan view of the reversible drive means for the recording means.
Figures 8, 9, 10:
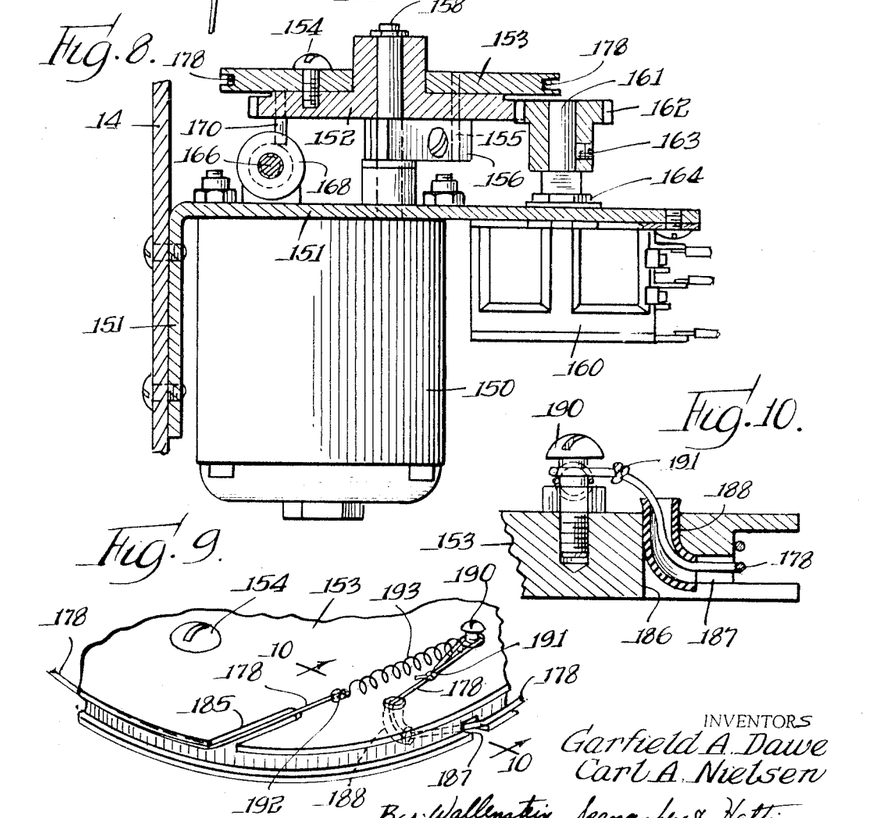
FIG. 8 is a vertical sectional view through the reversible drive means taken substantially along the line 8—8 of FIG. 7.
FIG. 9 is a partial perspective view of a portion of the reel of the reversible drive means of FIGS. 7 and 8.
FIG. 10 is a sectional view through a portion of the reel and taken substantially along the line 10—10 of FIG. 9.
Figures 16, 17, 18:
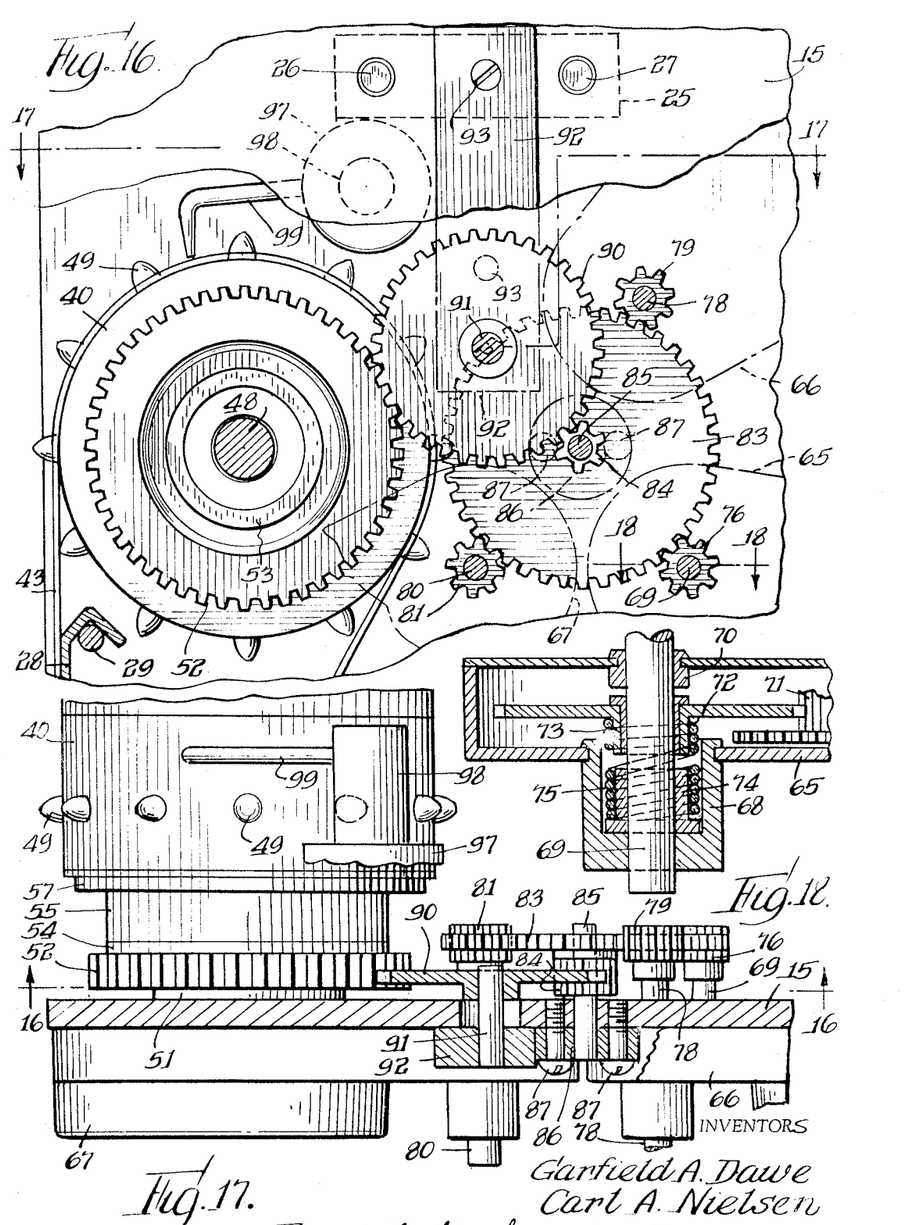
FIG. 16 is a vertical sectional view of the drive means for the chart feed roll taken substantially along the line 16—16 of FIG. 3.
FIG. 17 is a horizontal sectional view of the drive means for the chart feed roll taken substantially along the line 17—17 of FIG. 16.
FIG. 18 is a horizontal sectional view taken through a portion of one of the synchronous A.C. electric motors utilized for driving the chart feed roll and taken substantially along the line 18—18 of FIG. 16.

Referring more particularly to FIGS. 5, 6 and 17, the chart feed roll 40 is secured to a pair of hubs 45, 46 which in turn are suitably secured by set screws or pins 47 or the like to a shaft 48 which is journaled for rotation in the side plates 14 and 15. The hubs 45 and 46 carry pins 49 which extend radially outwardly from the chart feed roll 40 to be received in suitable holes and notches 50 in the recording chart 43 for positively advancing the chart 43 as the chart feed roll 40 is forwardly rotated. A thrust washer 51, which is preferably formed of hardened steel or the like, is arranged about the rotatable shaft 48 and is suitably secured to the inner side of the side plate 15. A drive gear 52, which is preferably made of nylon or the like, is rotatably mounted on the shaft 48 adjacent the thrust washer 51 and the gear 52 is preferably provided with an annular surface 53 for engaging the thrust washer 51. The other side of the gear 52 is engaged by a friction washer 54, preferably made of cork or the like, and the friction washer 54 is suitably secured to a ring 55. A circular disc 57 is secured to the ring 55 by means of screws 56 and the ring is mounted over the hub 46 and is pinned to the hub 46 by a pin 58. Thus, the ring 55 is operable through the pin 58 to rotate the chart feed roll 40. The other end of the rotatable shaft 48 is provided with a spherical recess for receiving a ball 59 which is engaged by a leaf spring 60 secured to the outer side of the side plate 14 by screws 61. The leaf spring 60 operating against the ball 59 resiliently urges the chart feed roll 40 and the ring 55 to the right, as illustrated in FIG. 5, to press the friction washer 54 against the drive gear 52 which is backed up by the thrust washer 51. In this way, the chart drive roll 40 is frictionally coupled to and frictionally driven by the drive gear 52, the amount of frictional coupling being regulated by manipulation of the screws 61. Thus, the chart feed roll 40 may be frictionally driven forwardly by the drive gear 52 and, if desired, the chart feed roll 40 may be rotated forwardly with respect to the drive gear 52 by manually pulling and advancing the recording chart 43. This provides for ready manual advance of the recording chart 43 if this be desired.

In accordance with this invention, the chart feed roll 40 is forwardly rotated at diffferent selected synchronous speeds and towards this end three synchronous A.C. electric motors 65, 66 and 67 are suitably removably mounted on the outside of the side plate 15 by means of screws or the like, as illustrated in FIGS. 2, 3, 16 and 17. Referring more particularly to FIG. 18, the synchronous A.C. electric motor 65 is provided with a journal 68 in which is rotatably mounted a shaft 69, the shaft 69 also being rotatably journaled by a bearing 70. The synchronous electric A.C. motor 65 is provided with a suitable gear reducer 71 which rotates a gear 72 rotatably mounted on the shaft 69. The gear 72 is provided with a hub 73, and a hub 74 is suitably secured to the shaft 69. A coil spring 75 is tightly wound upon the hubs 73 and 74 and the coil spring 75 is so arranged that, when the gear 72 of the motor 65 is driven, the coil spring 75 is stressed in the winding direction to tighten the same and cause forward rotation of the hub 75 and hence the shaft 69. When, however, the gear 72 is stationary and the shaft 69 is rotated in a forward direction, the spring 75 is stressed in an unwinding direction to loosen the same on the hub 74 and allow free forward rotation of the shaft 69. Thus, the hubs 73 and 74 and the coil spring 75 form a one-way override clutch to provide positive forward rotation of the shaft 69 when the synchronous A.C. electric motor 65 is energized. The shaft 69 extends through a suitable opening in the side plate 15 and carries on its inner end a pinion 76. The construction and operation of the synchronous A.C. electric motors 66 and 67 correspond to those of the synchronous A.C. electric motor 65, the motor 66 operating a shaft 78 extending through the side plate 15 and carrying a pinion 79, and the motor 67 operating a shaft 80 extending through the side plate 15 and carrying a pinion 81.

The pinions 76, 79 and 81 operated by the motors 65, 66 and 67 mesh with the gear portion 83 of a combination gear having a pinion portion 84, the combination gear being rotatably mounted on a pin 85 extending through the side plate 15 and carried by a block 86 secured to the outside of the side plate 15 by screws 87. An idler gear 90 meshes with the pinion portion 84 of the combination gear and with the drive gear 52 which frictionally drives the chart feed roll 40. This idler gear 90 is rotatably mounted on a pin 91 which extends through an enlarged hole in the side plate 15 and which is secured in a block 92 which in turn is adjustably secured to the outer side of the side plate 15 by screws 93. The diameter of the holes in the block 92 are greater than the diameter of the screws 93 so that the position of the idler gear 90 may be adjusted to appropriately mesh with the pinion 84 and the drive gear 52.

The synchronous A.C. electric motors 65, 66 and 67 operate to drive their respective pinions 76, 79 and 81 at different selected synchronous speeds, respectively, and by appropriate selection of the motors a wide variety of chart advancing speeds may be obtained, as for example, 1″ per hour, 1/10″ per minute, 1/2″ per minute, 1″ per minute, 2″ per minute, 5″ per minute, 10″ per minute, depending upon the particular motors selected and the particular selective energization of the selected motors. The selected energization of the selected motors may be controlled by a knob 95 on the front panel 19 of the instrument controlling a multiple switch in a switch box 96 carried by the rear of the panel 19. This multiple switch is electrically connected to a terminal block 94 which in turn is electrically connected to the respective motors 65, 66 and 67 so as to be selectively energized by manipulation of the switch. When the motor 65 is energized, it forwardly rotates the chart feed roll 40 through its pinion 76 at a predetermined synchronous speed, and while the pinion 76 is so forwardly rotating the chart feed roll 40, the other pinions 79 and 81 are being freely rotated by the gear portion 83 of the combination gear. In like manner, when the motor 66 is energized, its pinion 79 forwardly rotates the chart drive roll 40 at a different synchronous speed and the pinions 76 and 81 are freely rotated. Similarly, when the motor 67 is energized, its pinion 81 forwardly rotates the chart feed roll 40 at still a different synchronous speed and, here again, the pinions 76 and 79 are freely rotated.

Figure 3:
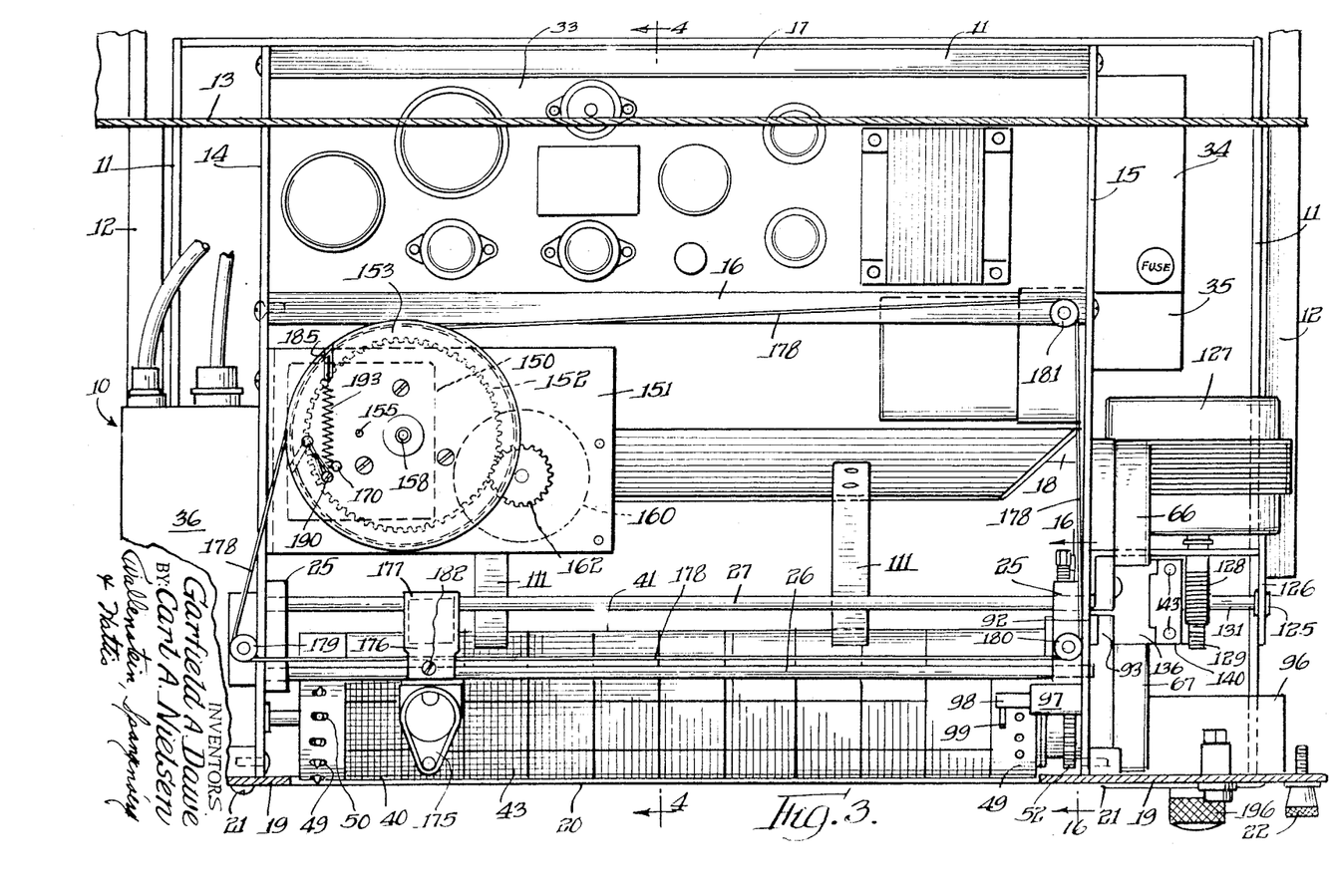
FIG. 3 is a top plan view of the instrument illustrated in FIGS. 1 and 2.
Figure 15:
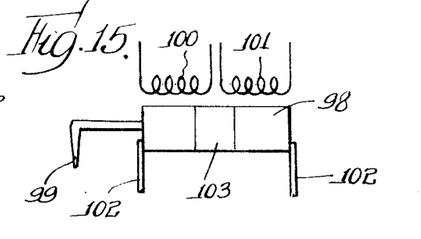
FIG. 15 is a diagrammatic illustration of the event marking means illustrated in FIGS. 3 and 5.

As shown more clearly in FIGS. 3 and 16 the side plate 15 carries an event marker 97 which operates an armature 98 which in turn transversely positions a pen 99 with respect to a portion of the chart 43. The event marker, as diagramatically illustrated in FIG. 15, may include a pair of solenoid windings 100 and 101 cooperating with the armature 98. The armature 98 is normally maintained in a mid position by a pair of springs 102 and it is provided at its center with a magnetic portion 103. The windings 100 and 101 are controlled by the switch 95 which controls the energization of the synchronous motors 65, 66 and, the arrangement is such that, when one of the motors is energized, neither winding 100, 101 is energized and, as a result, the pen 99 indicates by a mid position the energization of said one motor. When another motor is energized, the winding 100 is also energized to move the armature 98 to the left whereupon the pen 99 is moved to indicate on the chart that said other motor is energized. When the third motor is energized, the winding 101 is energized to move the armature 98 to the right whereupon the pen 99 is moved to a third position for indicating energization of the third motor. Thus, the pen 99, which is moved between three positions depending upon which motor is energized, operates to provide a visual indication on the recording chart 43 as to the speed of advance of the chart at the particular time.

As a specific example of the gearing arrangement for forwardly rotating the chart feed roll 40, the pinions 76, 79 and 81 have 12 teeth, the gear portion 83 of the combination gear has 60 teeth and the drive gear 52 has 72 teeth, the number of teeth on the idler gear 90 not being critical. The pinion portion 84 of the combination gear has 10 teeth for 60 cycle A.C. operation and 12 teeth for 50 cycle A.C. operation. Therefore, the ratios involved for 60 cycle A.C. operation are $12/60:10/72=1/36$ and the ratios involved for 50 cycle A.C. operation are $12/60:12/72=1/30$. Thus, it is seen, that by changing the combination gear having the gear portion 83 and pinion portion 84, the chart 43 may be advanced at desired selected constant speeds regardless of whether the applied A.C. power to the synchronous motors 65, 66 and 67 is 60 cycle power or 50 cycle power.

However, the pitch diameter of the pinion portion 84 of the combination gear having 12 teeth for 50 cycle operation is greater than the pitch diameter of the pinion portion 84 of the combination gear having 10 teeth for 60 cycle operation and, therefore, it is necessary to adjust the position of the idler gear 90 to accommodate these different pitch diameters when changing from 50 cycle operation to 60 cycle operation and vice versa. As expressed above, this is accomplished by adjusting the block 92 carrying the pin 91 on which the idler gear 90 is rotatably mounted. Accordingly, for 60 cycle or 50 cycle operation, all that is necessary is to select the appropriate combination gear and appropriately position the idler gear for the purpose of obtaining the selected forward synchronous rotation of the chart drive roll 40 for either 60 cycle or 50 cycle operation.

Figures 11, 12, 13:
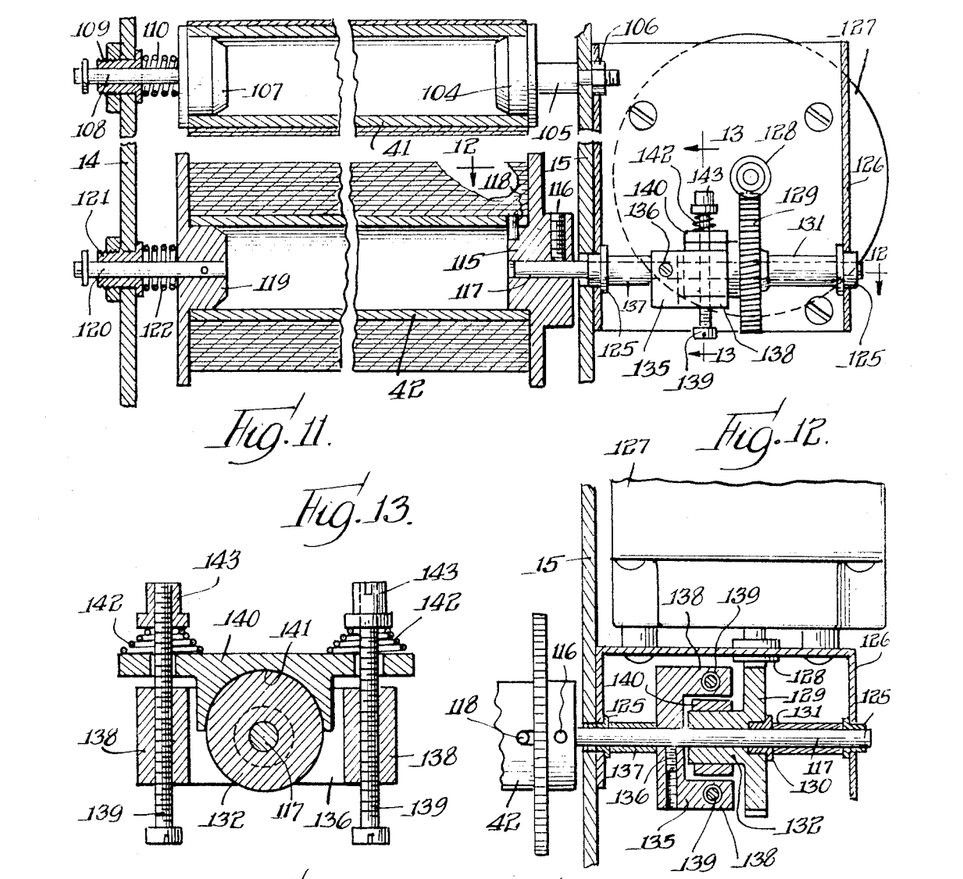
FIG. 11 is a vertical sectional view through the chart supply roll and the chart takeup roll and the driving means therefor and taken substantially along the lines 11—11 of FIGS. 2 and 4.
FIG. 12 is a horizontal sectional view through the drive means for the chart takeup roll taken substantially along the line 12—12 of FIG. 11.
FIG. 13 is a vertical sectional view through the drive means for the chart takeup roll taken substantially along the line 13—13 of FIG. 11 and showing the drive means in frictional engaging position.

Referring now more particularly to FIGS. 4 and 11, the chart supply roll 41 is usually a cardboard roll upon which the chart 43 has been wound. One end of the chart supply roll 41 is received over a hub 104 which is rotatably mounted on a stud 105 suitably secured by a nut 106 to the side plate 15. The other end of the chart supply roll 41 is received on a retractable rotatable hub 107 carried by a shaft 108 which is journaled at 109 in the side plate 14. A spring 110 normally urges the hub 107 inwardly for holding the chart supply roll 41 in place on the hub 107. When the chart supply roll 41 is inserted in the instrument, the hub 107 is first retracted against the action of the spring 110 and the chart supply roll is placed over the hub 104. Then the hub 107 is released and is advanced by the spring 110 to support the other end of the chart supply roll 41. Accordingly, the chart supply roll 41 is removably and rotatably mounted on the hubs 104 and 107. A pair of leaf springs 111 (FIGS. 3 and 4) resiliently engage the chart 43 on the chart supply roll 41 for applying a drag to the chart 43 as it is unrolled from the chart supply roll 41.

The chart takeup roll 42, which is also a cardboard roll, is removably mounted at one end on a flanged hub 115 which is secured by a set screw 116 to a rotatably mounted shaft 117. The chart takeup roll 42 is provided with a slot in one end which receives a pin 118 carried by the hub so that, as the hub 115 is rotated by the shaft 117, the chart takeup roll 42 is correspondingly positively rotated. The other end of the chart takeup roll 42 is removably supported by a flanged hub 119 which is secured to a shaft 120 journaled in a bearing 121 carried by the side plate 14, the flanged hub 119 being urged inwardly by a spring 122. When a chart takeup roll is inserted in the instrument, the flanged hub 119 is retracted against the action of the spring 122 and the chart takeup roll 42 is inserted over the flanged hub 115 with the slot in the roll receiving the pin 118. The flanged hub 119 is then released and the spring 122 advances the same for receiving and supporting the other end of the chart takeup roll 42.

Figure 14:
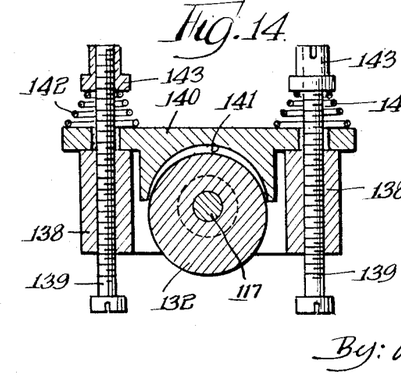
FIG. 14 is a vertical sectional view similar to FIG. 13 but showing the drive means in released position.

The manner in which the chart takeup roll 42 is driven is illustrated in FIGS. 11 to 14. Here, the shaft 117 which drives the chart takeup roll 42 is journaled by bearings 125 in a bracket 126 which is suitably secured to the outside of the side plate 15. An electric motor 127 is secured to the bracket 126 and it rotates a worm gear 128 which meshes with a gear 129 rotatably mounted on the shaft 117 by a bearing 130. A spacer 131 on the shaft 117 maintains the gear 129 in proper position with respect to the worm gear 128. Thus, as the worm gear 128 is rotated by the electric motor 127, the gear 129 is forwardly driven. The gear 129 is forwardly driven at a speed for forwardly rotating the chart takeup roll 42 at a speed which is substantially greater than the maximum speed of forward rotation of the chart feed roll 40. The gear 129 is integrally provided on one side with an eccentric 132. A follower 135, which cooperates with the eccentric 132, is fixedly secured to the shaft 117 by a set screw 136. A spacer 137 on the shaft 117 is interposed between the follower 135 and the bearing 125. The follower 135 is provided with a pair of extensions 138 which are arranged on opposite sides of the eccentric 132. A pair of screws 139 are carried by the pair of extensions 138, these screws extending outwardly from the extensions. A member 140 having enlarged holes is carried by screws 139 and this member 140 is provided with a substantially arcuate surface 141 which is adapted to be engaged by the high lobe of the eccentric 132. A pair of springs 142 arranged about the screws 139 and interposed between the member 140 and nuts 143 carried by the screws 139 resiliently urges the arcuate surface 141 of the member 140 into engagement with the high lobe of the eccentric 132. Thus, there is provided a frictional coupling between the member 140 and the eccentric 132 when the high lobe of the eccentric 132 engages the arcuate surface 141 of the member 140, as illustrated in FIG. 13. When, however, the high lobe of the eccentric 132 is displaced from the arcuate surface 141 of the member 140 and the low lobe of the eccentric 132 is adjacent thereto, as illustrated in FIG. 14, the member 140 engages the projections 138 so that the arcuate surface 141 does not engage the low lobe of the eccentric 132 as illustrated in FIG. 14. As a result, the follower 135 is freed from the eccentric 132 and may be freely rotated a limited amount with respect to the eccentric 132.

When the rotating eccentric 132 is engaged by the member 140 of the follower 135, the follower 135 and hence the chart takeup roll 42 are frictionally forwardly rotated, and since the eccentric 138 is rotated substantially faster than the chart feed roll 40, the chart 43 being wound on the chart takeup roll 42 is tensioned and resists rotation of the chart takeup roll 42. As a result, the eccentric 132 rotates with respect to the follower 135, and when the high lobe of the eccentric 132 disengages the member 140, the follower 135 is freed and is allowed to freely rotate a limited amount. The tension in the chart 43 is then released and the chart takeup roll is allowed to rotate a slight amount in the rearward direction which momentarily loosens the outer turn of the chart 43 on the takeup roll. As the eccentric 132 continues to rotate, the high lobe thereof again frictionally engages the member 140 of the follower 135 to again forwardly rotate the chart takeup roll 42 for tensioning the chart 43 and tightening the chart on the chart roll.

In this way, the chart takeup roll 42 is alternately frictionally driven and released so as to alternately tension and release the tension of the chart 43 between the chart drive roll 40 and the chart takeup roll 42. As a result of this alternate tensioning and releasing action, the chart 43 is uniformly and tightly wound upon the chart takeup roll 42 to provide a small and uniform and compact roll of the chart thereon.

Also, by reason of this frictional driving of the chart takeup roll 42, the chart 43 may be manually unrolled therefrom for observation purposes and after the unrolled chart is released the frictional drive of the chart takeup roll 42 operates to rapidly reroll the chart thereon without an intermittent action until such time as the chart is again tensioned by the operation of the chart takeup roll 42. Since the chart takeup roll 42 is rapidly rotated in the forward direction, the withdrawn chart is rapidly rerolled thereon.

The reversible operating means, which is controlled in accordance with the condition being measured for moving the recording means across the chart 43 for making a record on the chart, includes a reversible electric motor 150 which is carried by a bracket 151 which in turn is suitably secured to the inner side of the side plate 14. The reversible electric motor 150 operates to reversibly rotate a shaft 158, and rotatably mounted on the shaft 158 is an assembly including a gear 152 and a reel 153 which are secured together by screws 154. A pin 155 carried by the assembly 152, 153 extends downwardly therefrom and is received in a bifurcated member 156 which frictionally engages the shaft 158. A screw 157 extending through the bifurcated member 156 clamps the same to the pin 155 and to the shaft 158, so that the bifurcated member 156 and hence the assembly 152, 153 are frictionally driven by the shaft 158 as the shaft is rotated in one direction or the other by the reversible electric motor 150.

Also carried on the bracket 151 is a rotatable slide-wire unit 160 which is connected into the measuring circuit of the instrument. The rotatable slide-wire unit 160 is provided with a shaft 161 for rotating the same, a gear 162 being secured to this shaft by a set screw 163. The rotatable slide-wire unit 160 is secured in place on the bracket 151 by a nut 164. The gear 162 meshes with the gear 152, so that as the gear 152 and reel 153 are rotated, the rotatable slide-wire unit 160 is correspondingly rotated. A sub-bracket 167 secured to the bracket 151 carries a screw threaded stud 166 upon which is slidably mounted a stop member 168, the stop member 168 being a flange on a sleeve which is slidably mounted on the stud. A pair of nuts 169 are adjustably positioned on the stud 166 for adjustably positioning the stop member 168 and adjustably limiting the movement thereof. A pin 170 carried by the gear 152 extends downwardly therefrom and is adapted to engage one side or the other stop member 168 as the assembly 152, 153 is rotated in opposite directions to its extreme positions. By making the stop member 168 slidable within limits, the thickness of the stop pin 170 and the thickness of the stop member 168 are compensated for, so that the rotation of the assembly 152, 153 is limited to substantially 360 angular degrees. When the rotation of the assembly 152, 153 is stopped in either of its extreme positions by the stop pin 170 and the stop member 168, and the reversible electric motor 150 continues to operate, the frictional connection afforded by the member 156 permits continued rotation of the reversible motor 150 whereby complete stalling of the motor and damage to the parts is eliminated.

The recording means, which is moved across the chart 43, may take various forms, and for purposes of illustration herein it is shown to be an integral reservoir pen device 175. The pen device 175 is carried by a bracket 176 which is slidably mounted on the rod 26, and the bracket 176 is rearedly provided with a magnet 177 overlying the rod 27. The majority of the weight of the recording assembly is forward of the shaft 26 so that it tilts in that direction to cause the pen to engage the chart 43 for making a recording on the chart in accordance with the position of the assembly along the shaft 26. The assembly may be pivoted away from the chart 43, and when this is done the magnet 177 is attracted to the rod 27 so as to hold the assembly in this tilted position, this being illustrated in FIG. 4. A cord 178 is secured intermediate its ends to the bracket 176 by a clamping action afforded by a screw 182. A plurality of pulleys 179, 180 and 181 are mounted adjacent the side plates 14 and 15, and the cord 178 extends over these pulleys into engagement with the circumference of the reel 153, the circumference of the reel being channel shaped to receive the ends of the cord 178.

As shown more clearly in FIGS. 7 to 10, the upper face of the reel 153 is provided with a slot 185 which communicates with the circumference of the reel 153. The reel 153 is also provided with a hole 186 therethrough and a slot 187 which also communicates with the circumference of the reel 153, the slot 185 communicating with the top portion of the circumference of the reel and the slot 187 communication with the bottom portion of the circumference of the reel. A small plastic tube 188 is arranged in the hole 186 and it communicates with the slot 187. The end of the cord 178 which courses the pulley 179 extends through the slot 187 and the tube 188 and is secured to a screw 190 carried by the upper face of the reel 153, it being looped over the screw 190 and knotted in place as indicated by the knot 191. Thus, this end of the cord 178 is rigidly fixed to the reel 153. The other end of the cord 178 which courses the pulley 181 extends through the upper slot 185 and is secured by a knot 192 to one end of a coil spring 193, the other end of the coil spring 193 being secured to the screw 190. Thus, this end of the cord 178 is resiliently attached to the reel 153 to maintain the cord 178 taut at all times.

Accordingly, when the reversible electric motor 150 is rotated in one direction or the other, the reel 153 moves the cord 178 to correspondingly position the recording means 175 transversely of the chart 43 on the chart feed roll 40, and at the same time the rotatable slide-wire unit 160 is correspondingly rotated. The substantially 360 angular degrees of rotation of the reel 153 by the reversible electric motor 150 operates to move the recording means 175 at least entirely across the graduated chart 43. As expressed above, the reversible electric motor 150 may be operated in one direction or the other by the electrical and electronic equipment disclosed in the above identified Dawe et al., Patent No. 2,931,964 to position the recording means 175 with respect to the graduated chart 43 in accordance with the value of the condition being measured by the measuring and recording instrument of this invention.

The front panel 19 of the instrument of this invention is provided with an indicating lamp 195 for indicating the operative condition of the instrument, it being illuminated when power is applied to the instrument. The front panel of the instrument is also provided with a knob 196 for operating a power switch in the switch box 96, the switch being moved by the knob 196 selectively to off, standby, pen and record positions. In the off position all power to the instrument is interrupted. In the standby position all circuits except the pen and chart drive systems are energized. In the pen position the electric and electronic balancing system is active, providing indication of the output signal. In the record position the chart is also driven for full recording of the signal, and the speed of advance of the chart is controlled by the chart speed control knob 95. The front panel 19 is also provided with a knob 197 for operating a variable resistance in the measuring circuit to provide full scale displacement of the zero position of the recording means 175 and to accommodate zero on the left operation as well as zero on the right. A further knob 198 carried by the front panel 19 operates a variable resistance to provide adjustment of the amplifier which controls the reversible electric motor 150 to provide critical damping of the movement of the recording means 175.

While for purposes of illustration one form of this invention has been disclosed, other forms thereof may become apparent to those skilled in the art upon reference to this disclosure and, therefore, this invention is to be limited only by the scope of the appended claims.

We claim as our invention:

1. In a measuring and recording instrument having recording means adjacent a chart feed roll and movable across a chart for making a record on the chart, the improvement comprising, a frame including a pair of side plates, a shaft extending between and rotatably mounted in said side plates adjacent the top of the frame, a chart feed roll fixedly secured to said shaft between said side plates for advancing the chart, a synthetic plastic drive gear rotatably mounted on said shaft between one end of said chart drive roll and one of said side plates, a hardened steel thrust washer about said shaft between said drive gear and said one side plate and secured to said one side plate, a cork friction washer about said shaft between said drive gear and said one end of said chart feed roll and secured to said one end of said chart feed roll, spring means carried by the other of said side plates and operating against said shaft for resiliently urging said friction washer against said drive gear and said drive gear against said thrust washer to frictionally couple said chart feed roll to said drive gear, and electric motor means gear connected to said drive gear for positively driving said drive gear and frictionally driving said chart feed roll.

2. In a measuring and recording instrument having recording means adjacent a chart feed roll and movable across a chart for making a record on the chart, the improvement comprising, a frame including a pair of side plates, a chart feed roll rotatably mounted between said side plates adjacent to the top of the frame for advancing the chart, a drive gear coupled to said chart feed roll for rotating the same, a plurality of synchronous A.C. electric motors carried by one of the side plates and each including reduction gearing, a driving pinion and a one-way over-drive clutch between the reduction gearing and the driving pinion for rotating the driving pinion forwardly when the motor is energized and for allowing forward rotation of the driving pinion when the motor is deenergized, said driving pinions of the plurality of motors being driven forwardly at different selected synchronous speeds upon energization of their respective motors, continuously engaged gear connections between said driving pinions and said drive gear for rotating said drive gear and hence said chart feed roll, and electrical circuit means including switch means for selectively energizing said synchronous A.C. electric motors for forwardly rotating said chart feed roll at desired selected synchronous speeds to advance the chart at selected constant speeds.

3. In a measuring and recording instrument having recording means adjacent a chart feed roll and movable across a chart for making a record on the chart, the improvement comprising, a frame including a pair of side plates, a chart feed roll rotatably mounted between said side plates adjacent the top of the frame for advancing the chart, a drive gear coupled to said chart feed roll for rotating the same, a plurality of synchronous A.C. electric motors carried by one of the side plates and each including reduction gearing, a driving pinion and a one-way over-drive clutch between the reduction gearing and the driving pinion for rotating the driving pinion forwardly when the motor is energized and for allowing forward rotation of the driving pinion when the motor is deenergized, said driving pinions of the plurality of motors being driven forwardly at different selected synchronous speeds upon energization of their respective motors, a combination gear carried by said one side plate and having a pinion portion and a gear portion continuously meshing with said driving pinions of said plurality of motors so as to be rotated thereby, an idler gear carried by said one side plate and meshing with the pinion portion of said combination gear and with said drive gear for rotating said drive gear and hence said chart feed roll, and electrical circuit means including switch means for selectively energizing said synchronous A.C. electric motors for forwardly rotating said chart feed roll at desired selected synchronous speeds to advance the chart at selected constant speeds.

4. In a measuring and recording instrument having recording means adjacent a chart feed roll and movable across a chart for making a record on the chart, the improvement comprising, a frame including a pair of side plates, a chart feed roll rotatably mounted between said side plates adjacent the top of the frame for advancing the chart, a drive gear coupled to said chart feed roll for rotating the same, a plurality of synchronous A.C. electric motors carried by one of the side plates and each including reduction gearing, a driving pinion and a one-way over-drive clutch between the reduction gearing and the driving pinion for rotating the driving pinion forwardly when the motor is energized and for allowing forward rotation of the driving pinion when the motor is deenergized, said driving pinions of the plurality of motors being driven forwardly at different selected synchronous speeds upon energization of their respective motors, said synchronous A.C. electric motors adapted to be driven by 50 cycle or 60 cycle A.C. current, alternative combination gears for 50 cycle or 60 cycle operations selectively carried by said one side plate and having a pinion portion and a gear portion continuously meshing with said driving pinions of said plurality of motors so as to be rotated thereby, said pinion portions of said alternative combination gears having different numbers of teeth and different pitch diameters for 50 cycle and 60 cycle operation, an idler gear meshing with the pinion portion of the selected combination gear and with said drive gear for rotating said drive gear and hence said chart feed roll, means for adjustably mounting said idler gear on said one side plate for appropriately meshing said idler gear with the pinion portions of different pitch diameters of the selected one of said combination gears, and electrical circuit means including switch means for selectively energizing said synchronous A.C. electric motors for forwardly rotating said chart feed roll at desired selected synchronous speeds to advance the chart at selected constant speeds.

5. In a measuring and recording instrument having recording means adjacent a chart feed roll and movable across a chart for making a record on the chart, the improvement comprising, a frame including a pair of side plates, a shaft extending between and rotatably mounted in said side plates adjacent the top of the frame, a chart feed roll fixedly secured to said shaft between said side plates for advancing the chart, a synthetic plastic drive gear rotatably mounted on said shaft between one end of said chart drive roll and one of said side plates, a hardened steel thrust washer about said shaft between said drive gear and said one side plate and secured to said one side plate, a cork friction washer about said shaft between said drive gear and said one end of said chart feed roll and secured to said one end of said chart feed roll, spring means carried by the other of said side plates and operating against said shaft for resiliently urging said friction washer against said drive gear and said drive gear against said thrust washer to frictionally couple said chart feed roll to said drive gear, a plurality of synchronous A.C. electric motors carried by said one side plate and operated at different synchronous speeds, continuously engaged gear connections between said drive gear and motors and including a one-way over-ride clutch associated with each motor for rotating said drive gear, and electrical circuit means including switch means for selectively energizing said synchronous A.C. electric motors for forwardly rotating said chart feed roll at desired selected synchronous speeds to advance the chart at selected constant speeds.

6. In a measuring and recording instrument having recording means adjacent a chart feed roll and movable across a chart for making a record on the chart, the improvement comprising, a frame including a pair of side plates, a chart feed roll rotatably mounted between said side plates adjacent the top of the frame for advancing the chart, a drive gear between one of the side plates and one end of the chart feed roll, means including a friction washer between the drive gear and the chart feed roll for frictionally rotating the chart feed roll as the drive gear is rotated, a plurality of synchronous A.C. electric motors carried by said one side plate and each including reduction gearing, a driving pinion and a one-way over-drive clutch between the reduction gearing and the driving pinion for rotating the driving pinion forwardly when the motor is energized and for allowing forward rotation of the driving pinion when the motor is deenergized, said driving pinions of the plurality of motors being driven forwardly at different selected synchronous speeds upon energization of their respective motors, continuously engaged gear connections between said driving pinions and said drive gear for rotating said drive gear and hence said chart feed roll, and electrical circuit means including switch means for selectively energizing said synchronous A.C. electric motors for forwardly rotating said chart feed roll at desired selected synchronous speeds to advance the chart at selected constant speeds.

7. In a measuring and recording instrument having recording means adjacent a chart feed roll and movable across a chart for making a record on the chart, the improvement comprising, a frame including a pair of side plates, a shaft extending between and rotatably mounted in said side plates adjacent the top of the frame, a chart feed roll fixedly secured to said shaft between said side plates for advancing the chart, a synthetic plastic drive gear rotatably mounted on said shaft between one end of said chart drive roll and one of said side plates, a hardener steel thrust washer about said shaft between said drive gear and said one side plate and secured to said one side plate, a cork friction washer about said shaft between said drive gear and said one end of said chart feed roll and secured to said one end of said chart feed roll, spring means carried by the other of said shaft for resiliently urging said friction washer against said drive gear and said drive gear against said thrust washer to frictionally couple said chart feed roll to said drive gear, a plurality of synchronous A.C. electric motors carried by said one side plate and each including reduction gearing, a driving pinion and a one-way over-drive clutch between the reduction gearing and the driving pinion for rotating the driving pinion forwardly when the motor is energized and for allowing forward rotation of the driving pinion when the motor is deenergized, said driving pinions of the plurality of motors being driven forwardly at different selected synchronous speeds upon energization of their respective motors, continuously engaged gear connections between said driving pinions and said drive gear for rotating said drive gear and hence said chart feed roll, and electrical circuit means including switch means for selectively energizing said synchronous A.C. electric motors for forwardly rotating said chart feed roll at desired selected synchronous speeds to advance the chart at selected constant speeds.

8. In a measuring and recording instrument having recording means adjacent a chart feed roll and movable across a chart for making a record on the chart, the improvement comprising, a frame including a pair of side plates, a chart feed roll rotatably mounted between said side plates adjacent the top of the frame for advancing the chart, a drive gear between one of the side plates and one end of the chart feed roll, means including a friction washer between the drive gear and the chart feed roll for frictionally rotating the chart feed roll as the drive gear is rotated, a plurality of synchronous A.C. electric motors carried by said one side plate and operated at different synchronous speeds, continuously engaged gear connections between said drive gear and motors and including a one-way over-ride clutch associated with each motor for rotating said drive gear, and electrical circuit means including switch means for selectively energizing said synchronous A.C. electric motors for forwardly rotating said chart feed roll at desired selected synchronous speeds to advance the chart at selected constant speeds.

9. In a measuring and recording instrument having recording means adjacent a chart feed roll and movable across a chart for making a record on the chart, the improvement comprising, a frame including a pair of side plates, a chart feed roll rotatably mounted between said side plates adjacent the top of the frame for advancing the chart, a drive gear between one of the side plates and one end of the chart feed roll, means including a friction washer between the drive gear and the chart feed roll for frictionally rotating the chart feed roll as the drive gear is rotated, a plurality of synchronous A.C. electric motors carried by said one side plate and operated at different synchronous speeds, continuously engaged gear connections between said drive gear and motors and including a one-way over-ride clutch associated with each motor for rotating said drive gear, and electrical circuit means including switch means for selectively energizing said synchronous A.C. electric motors for forwardly rotating said chart feed roll at desired selected synchornous speeds to advance the chart at selected constant speeds, electrically operated event marking means adjacent the chart feed roll and movable with respect to the chart for making a plurality of different event records on the chart, and further electrical circuit means controlled by said switch means for operating said event marking means for recording on the chart the selective energization of the plurality of synchronous A.C. electric motors and hence the selected constant speed of advance of the chart by the chart feed roll.

10. In a measuring and recording instrument having recording means adjacent a chart feed roll and movable across a chart for making a record on the chart, the improvement comprising, a frame including a pair of side plates, a chart feed roll rotatably mounted between said side plates adjacent to the top of the frame for advancing the chart, a drive gear coupled to said chart feed roll for rotating the same, a plurality of synchronous A.C. electric motors carried by one of the side plates and each including reduction gearing, a driving pinion and a one-way over-drive clutch between the reduction gearing and the driving pinion for rotating the driving pinion forwardly when the motor is energized and for allowing forward rotation of the driving pinion when the motor is deenergized, said driving pinions of the plurality of motors being driven forwardly at different selected synchronous speeds upon energization of their respective motors, continuously engaged gear connections between said driving pinions and said drive gear for rotating said drive gear and hence said chart feed roll, and electrical circuit means including switch means for selectively energizing said synchronous A.C. electric motors for forwardly rotating said chart feed roll at desired selected synchronous speeds to advance the chart at selected constant speeds, electrically operated event marking means adjacent the chart feed roll and movable with respect to the chart for making a plurality of different event records on the chart, and further electrical circuit means controlled by said switch means for operating said event marking means for recording on the chart the selective energization of the plurality of synchronous A.C. electric motors and hence the selected constant speed of advance of the chart by the chart feed roll.

11. In a measuring and recording instrument having recording means adjacent a chart feed roll and movable across a chart for making a record on the chart, the improvement comprising, a frame including a pair of side plates, a chart feed roll rotatably mounted between said side plates, a chart supply roll rotatably mounted between said side plates, a chart takeup roll rotatably mounted between said side plates, a chart extending from the chart supply roll over the chart feed roll to the chart takeup roll, a first synchronous electric motor means carried by one of said side plates, gear connections between said first electric motor means and said chart feed roll for forwardly rotating said chart feed roll at a desired synchronous speed to advance the chart at a desired constant speed, a second electric motor carried by one of said side plates, a driving connection between said second electric motor and said chart takeup roll for normally tending to forwardly rotate said chart takeup roll at a speed which is substantially greater than the speed of rotation of said chart feed roll, said driving connection including a first part driven by said second electric motor, a second part connected to said chart takeup roll and independently rotatable with respect to said first part, and a spring biased member carried by one of said parts and frictionally engaging the other of said parts when said parts are in one relative rotative position with respect to each other to frictionally forwardly rotate said chart takeup roll until the resistance to rotation of said chart takeup roll reaches a predetermined value, and said member being free from said other part when said parts are in another relative rotative position with respect to each other to free said chart takeup roll and permit limited free reverse rotation of said chart takeup roll, whereby the chart is automatically tightened and loosened on said chart takeup roll as it is being wound thereon to provide tight and uniform rolling of the chart on said chart takeup roll.

12. In a measuring and recording instrument having recording means adjacent a chart feed roll and movable across a chart for making a record on the chart, the improvement comprising, a frame including a pair of side plates, a chart feed roll rotatably mounted between said side plates, a chart supply roll rotatably mounted between said side plates, a chart takeup roll rotatably mounted between said side plates, a chart extending from the chart supply roll over the chart feed roll to the chart takeup roll, a plurality of synchronous A.C. electric motors carried by one of said side plates and operated at different synchronous speeds, continuously engaged gear connections between said drive gear and motors and including a one-way over-ride clutch associated with each motor for rotating said drive gear, and electrical circuit means including switch means for selectively energizing said synchronous A.C. electric motors for forwardly rotating said chart feed roll at desired selected synchronous speeds to advance the chart at selected constant speeds, an additional electric motor carried by one of said side plates, a driving connection between said additional electric motor and said chart takeup roll for normally tending to forwardly rotate said chart takeup roll at a speed which is substantially greater than the maximum selected speed of rotation of said chart feed roll, said driving connection including a first part driven by said additional electric motor, a second part connected to said chart takeup roll and independently rotatable with respect to said first part, and a spring biased member carried by one of said parts and frictionally engaging the other of said parts when said parts are in one relative rotative position with respect to each other to frictionally forwardly rotate said chart takeup roll until the resistance to rotation of said chart takeup roll reaches a predetermined value, and said member being free from said other part when said parts are in another relative rotative position with respect to each other to free said chart takeup roll and permit limited free reverse rotation of said chart takeup roll, whereby the chart is automatically tightened and loosened on said chart takeup roll as it is being wound thereon to provide tight and uniform rolling of the chart on said chart takeup roll.

13. In a measuring and recording instrument having recording means adjacent a chart feed roll and movable across a chart for making a record on the chart, the improvement comprising, a frame including a pair of side plates, a chart feed roll rotatably mounted between said side plates, a chart supply roll rotatably mounted between said side plates, a chart takeup roll rotatably mounted between said side plates, a chart extending from the the chart supply roll over the chart feed roll to the chart takeup roll, a first synchronous electric motor means carried by one of said side plates, a gear connections between said first electric motor means and said chart feed roll forwardly rotating said chart feed roll at a desired synchronous speed to advance the chart at a desired constant speed, a second electric motor carried by one of said side plates, a driving connection between said second electric motor and said chart takeup roll for normally tending to forwardly rotate said chart takeup roll at a speed which is substantially greater than the speed of rotation of said chart feed roll, said driving connection including an eccentric driven by said second electric motor, a follower connected to said chart takeup roll and independently rotatable with respect to said eccentric, and a spring biased member carried by the follower and frictionally engaging said eccentric when said eccentric and follower are in one relative position with respect to each other to frictionally forwardly rotate said chart takeup roll until the resistance to rotation of said chart takeup roll reaches a predetermined value, and said member being free from said eccentric when said eccentric and follower are in another relative rotative position with respect to each other to free said chart takeup roll and permit limited free reverse rotation of said chart takeup roll, whereby the chart is automatically tightened and loosened on said chart takeup roll as it is being wound thereon to provide tight and uniform rolling of the chart on said chart takeup roll.

14. In a measuring and recording instrument having recording means adjacent a chart feed roll and movable across a chart for making a record on the chart, the improvement comprising, a frame including a pair of side plates, a chart feed roll rotatably mounted between said side plates, a chart supply roll rotatably mounted between said side plates, a chart takeup roll rotatably mounted between said side plates, a chart extending from the chart supply roll over the chart feed roll to the chart takeup roll, a plurality of synchronous A.C. electric motors carried by one of said side plates and operated at different synchronous speeds, continuously engaged gear connections between said drive gear and motors and including a one-way over-ride clutch associated with each motor for rotating said drive gear, and electrical circuit means including switch means for selectively energizing said synchronous A.C. electric motors for forwardly rotating said chart feed roll at desired selected synchronous speeds to advance the chart at selected constant speeds, an additional electric motor carried by one of said side plates, a driving connection between said additional electric motor and said chart takeup roll for normally tending to forwardly rotate said chart takeup roll at a speed which is substantially greater than the maximum selected speed of rotation of said chart feed roll, said driving connection including an eccentric driven by said additional electric motor, a follower connected to said chart takeup roll and independently rotatable with respect to said eccentric, and a spring biased member carried by the follower and frictionally engaging said eccentric when said eccentric and follower are in one relative position with respect to each other to frictionally forwardly rotate said chart takeup roll until the resistance to rotation of said chart takeup roll reaches a predetermined value, and said member being free from said eccentric when said eccentric and follower are in another relative rotative position with respect to each other to free said chart takeup roll and permit limited free reverse rotation of said chart takeup roll, whereby the chart is automatically tightened and loosened on said chart takeup roll as it is being wound thereon to provide tight and uniform rolling of the chart on said chart takeup roll.

15. In a measuring and recording instrument having recording means adjacent a chart feed roll and movable across a chart for making a record on the chart and a chart takeup roll for taking the chart from the chart feed roll, the improvement comprising, means for forwardly rotating the chart feed roll at a synchronous speed for advancing the chart at a constant speed, means for normally tending to forwardly rotate said chart takeup roll at a speed which is substantially greater than the speed of rotation of said chart feed roll, said last mentioned means including a continuously rotated eccentric, a follower connected to said chart takeup roll and independently rotatable with respect to said eccentric, and a spring biased member carried by the follower and frictionally engaging said eccentric when said eccentric and follower are in one relative position with respect to each other to frictionally forwardly rotate said chart takeup roll until the resistance to rotation of said chart takeup roll reaches a predetermined value, and said member being free from said eccentric when said eccentric and follower are in another relative rotative position with respect to each other to free said chart takeup roll and permit limited free reverse rotation of said chart takeup roll, whereby the chart is automatically tightened and loosened on said chart takeup roll as it is being wound thereon to provide tight and uniform rolling of the chart on said chart takeup roll.

16. In a measuring and recording instrument having a frame including a pair of side plates, a rotating chart feed roll carried by and between said side plates for advancing a chart, and recording means adjacent the chart feed roll and movable across the chart for making a record on the chart, the improvement comprising, a reversible electric motor secured to one of the side plates between the side plates behind the chart feed roll, a gear and reel assembly carried by said reversible electric motor, a friction drive connection between said reversible electric motor and said gear and reel assembly for rotating the latter, a rotatable slide wire unit, a gear connection between the gear of said assembly and the slide wire unit for rotating the latter as said assembly is rotated, a plurality of guide pulleys mounted adjacent said side plates, a cord secured intermediate its ends to said recording means and extending over said guide pulleys and engaging the circumference of the reel of said assembly for moving said recording means as said assembly is rotated, said reel having a slot in one face communicating with the circumference of the reel, a hole communicating with the circumference of the reel and said one face and a pin extending from said one face, one end of said cord extending through the hole and secured to the pin, the other end of said cord extending through the slot and a spring securing said other end of the cord to said pin, a stop member located adjacent said gear and reel assembly and having limited movement, and a stop pin carried by said gear and reel assembly adapted to alternately engage opposite sides of said stop member to limit rotation of said gear and reel assembly to substantially 360 angular degrees, said friction drive connection permitting continued rotation of said reversible electric motor even though rotation of said gear and reel assembly is limited.

17. In a measuring and recording instrument having a frame including a pair of side plates, a rotating chart feed roll carried by and between said side plates for advancing a chart, and recording means adjacent the chart feed roll and movable across the chart for making a record on the chart, the improvement comprising, a reversible electric motor secured to one of the side plates between the side plates behind the chart feed roll, a gear and reel assembly carried by said reversible electric motor and rotated thereby, a rotatable slide wire unit, a gear connection between the gear of said assembly and the slide wire unit for rotating the latter as said assembly is rotated, a plurality of guide pulleys mounted adjacent said side plates, a cord secured intermediate its ends to said recording means and extending over said guide pulleys and engaging the circumference of the reel of said assembly for moving said recording means as said assembly is rotated, said reel having a slot in one face communicating with the circumference of the reel nearest to said one face, a hole communicating with the circumference of the reel farthest from said one face and with said one face and a pin extending from said one face, one end of said cord extending through the hole and secured to the pin, the other end of said cord extending through the slot and a spring securing said other end of the cord to said pin.

18. In a measuring and recording instrument having a frame including a pair of side plates, a rotating chart feed roll carried by and between said side plates for advancing a chart, and recording means adjacent the chart feed roll and movable across the chart for making a record on the chart, the improvement comprising, a reversible electric motor secured to one of the side plates between the side plates behind the chart feed roll, a gear and reel assembly carried by said reversible electric motor, a friction drive connection between said reversible electric motor and said gear and reel assembly for rotating the latter, a rotatable slide wire unit, a gear connection between the gear of said assembly and the slide wire unit for rotating the latter as said assembly is rotated, a plurality of guide pulleys mounted adjacent said side plates, a cord secured intermediate its ends to said recording means and extending over said guide pulleys and engaging the circumference of the reel of said assembly for moving said recording means as said assembly is rotated, a stop member located adjacent said gear and reel assembly and having limited movement, and a stop pin carried by said gear and reel assembly adapted to alternately engage opposite sides of said stop member to limit rotation of said gear and reel assembly to substantially 360 angular degrees, said friction drive connection permitting continued rotation of said reversible electric motor even though rotation of said gear and reel assembly is limited.

References Cited by the Examiner

UNITED STATES PATENTS

| | | | |
|---|---|---|---|
| 2,278,919 | 4/1942 | Erickson et al. | 346—139 |
| 2,931,964 | 4/1960 | Dawe et al. | 346—136 |
| 3,015,536 | 1/1962 | Nielsen et al. | 346—136 |
| 3,154,368 | 10/1964 | Daigler et al. | 346—112 |

FOREIGN PATENTS 80,904  10/1952  Norway.

RICHARD B. WILKINSON, *Primary Examiner.*

J. G. MURRAY, *Assistant Examiner.*